(12) United States Patent
Nishikouji et al.

(10) Patent No.: US 7,535,531 B2
(45) Date of Patent: May 19, 2009

(54) BIREFRINGENT OPTICAL FILM, LAMINATED POLARIZING PLATE, LIQUID CRYSTAL DISPLAY AND IMAGE

(75) Inventors: Yuuichi Nishikouji, Ibaraki (JP); Hiroyuki Yoshimi, Ibaraki (JP); Nao Murakami, Ibaraki (JP)

(73) Assignee: Nitto Denko Corporation, Ibaraki-Shi, Osaka (JP)

(*) Notice: Subject to any disclaimer, the term of this patent is extended or adjusted under 35 U.S.C. 154(b) by 63 days.

(21) Appl. No.: 10/540,486

(22) PCT Filed: Jul. 23, 2004

(86) PCT No.: PCT/JP2004/010469
§ 371 (c)(1),
(2), (4) Date: Jun. 23, 2005

(87) PCT Pub. No.: WO2005/012962
PCT Pub. Date: Feb. 10, 2005

(65) Prior Publication Data
US 2006/0072221 A1    Apr. 6, 2006

(30) Foreign Application Priority Data
Aug. 1, 2003    (JP)    ............... 2003-285192

(51) Int. Cl.
*G02F 1/1335* (2006.01)
(52) U.S. Cl. .................. 349/118; 349/117; 349/119
(58) Field of Classification Search .......... 349/117–120
See application file for complete search history.

(56) References Cited

U.S. PATENT DOCUMENTS

| | | | | |
|---|---|---|---|---|
| 5,093,739 | A * | 3/1992 | Aida et al. ................. | 349/120 |
| 5,249,071 | A * | 9/1993 | Yoshimizu et al. .......... | 349/102 |
| 5,855,971 | A | 1/1999 | Kobori et al. | |
| 5,875,014 | A * | 2/1999 | Kuwabara et al. .......... | 349/117 |
| 5,956,110 | A * | 9/1999 | Fujita et al. ................ | 349/118 |
| 6,208,396 | B1 | 3/2001 | Shimizu et al. | |
| 6,303,743 | B1 | 10/2001 | You et al. | |
| 6,437,843 | B1 * | 8/2002 | Van De Witte et al. ...... | 349/117 |
| 6,567,143 | B1 * | 5/2003 | VanderPloeg et al. ....... | 349/120 |

(Continued)

FOREIGN PATENT DOCUMENTS

CN    1412582 A    4/2003

(Continued)

OTHER PUBLICATIONS

Uchiyama et al., Recent Progress in Optical Retardation Films for FPDs, pp. 493-496, 2001.*

(Continued)

*Primary Examiner*—Andrew Schechter
*Assistant Examiner*—Lauren Nguyen
(74) *Attorney, Agent, or Firm*—Westerman, Hattori, Daniels & Adrian, LLP.

(57) ABSTRACT

The present invention provides a birefringent optical film that allows a liquid crystal display to achieve excellent contrast and a wide viewing angle and does not cause coloring of the liquid crystal display. The birefringent optical film includes at least one birefringent A-layer having a property satisfying $ny_a \geq nz_a > nx_a$ or $nz_a > ny_a > nz_a$ and at least one birefringent B-layer having a property satisfying $nx_b \geq ny_b > nz_b$.

14 Claims, 1 Drawing Sheet

U.S. PATENT DOCUMENTS

| | | | |
|---|---|---|---|
| 6,693,692 B1 * | 2/2004 | Kaneko et al. | 349/117 |
| 6,717,642 B2 | 4/2004 | Sasaki et al. | |
| 6,995,816 B2 * | 2/2006 | Mi et al. | 349/96 |
| 7,054,049 B2 | 5/2006 | Murakami et al. | |
| 2003/0016446 A1 * | 1/2003 | Yano et al. | 359/500 |
| 2003/0125503 A1 * | 7/2003 | Sakamoto et al. | 528/125 |
| 2003/0231270 A1 * | 12/2003 | Kume et al. | 349/119 |
| 2005/0030456 A1 | 2/2005 | Murakami et al. | |
| 2006/0098145 A1 * | 5/2006 | Kim et al. | 349/117 |

FOREIGN PATENT DOCUMENTS

| | | |
|---|---|---|
| EP | 1 160 591 A1 | 12/2001 |
| JP | H03-24502 A | 2/1991 |
| JP | H03-33719 A | 2/1991 |
| JP | H05-27118 A | 2/1993 |
| JP | 5-27118 | 5/1993 |
| JP | 6-75221 A | 3/1994 |
| JP | 06-265875 A | 9/1994 |
| JP | 7-110405 A | 4/1995 |
| JP | H08-511812 A | 12/1996 |
| JP | H10-508048 A | 8/1998 |
| JP | 2000-162436 | 6/2000 |
| JP | 2000-162436 A | 6/2000 |
| JP | 2000-190385 A | 7/2000 |
| JP | 2000-227520 | 8/2000 |
| JP | 2000-227520 A | 8/2000 |
| JP | 2000-511296 A | 8/2000 |
| JP | 2001-49110 A | 2/2001 |
| JP | 2001-343529 A | 12/2001 |
| JP | 2003-211464 A | 7/2003 |
| TW | 373096 | 7/1995 |
| WO | WO 94-24191 A1 | 10/1994 |
| WO | WO 96-11967 A1 | 4/1996 |
| WO | WO 97-44704 A1 | 11/1997 |
| WO | WO 03/062875 A1 | 7/2003 |

OTHER PUBLICATIONS

Taiwanese Office Action dated Aug. 13, 2007, issued in corresponding Taiwanese Patent Application No. 93122875 with a partial English Translation and Verification of Translation.

Japanese Office Action dated Sep. 11, 2008 (mailing date), issued in corresponding Japanese Patent Application No. 2003-285192.

Chinese Office Action dated Apr. 6, 2007 (mailing date), issued in corresponding Chinese Patent Application No. 2004800167930.

* cited by examiner

BIREFRINGENT OPTICAL FILM, LAMINATED POLARIZING PLATE, LIQUID CRYSTAL DISPLAY AND IMAGE

TECHNICAL FIELD

The present invention relates to a birefringent optical film.

BACKGROUND ART

Conventionally, in order to allow a liquid crystal display to achieve excellent contrast, a biaxial birefringent optical film has been used as a retardation plate. In general, a biaxial birefringent optical film is produced by stretching an isotropic polymer film (see Patent Documents 1 and 2, for example).

Also, by stretching a uniaxial polymer film (see Patent Document 3, for example), it is possible to produce a biaxial birefringent optical film (see, Patent Document 4, for example). A liquid crystal display incorporating such a biaxial birefringent optical film can achieve excellent contrast. However, since the And values exhibited by the biaxial birefringent optical film are in only a narrow limited range, wide viewing angles in accordance with various mode types have not yet been realized sufficiently by the use of the biaxial birefringent optical film. Moreover, there has been a problem in that display coloring may be caused in a liquid crystal display, e.g., a VA mode liquid crystal display, incorporating the biaxial birefringent optical film.

Patent Document 1: JP 3(1991)-33719 A
Patent Document 2: JP 3(1991)-24502A
Patent Document 3: JP 8(1996)-511812 A
Patent Document 4: JP 2000-190385 A

DISCLOSURE OF INVENTION

Problem to be Solved by the Invention

It is an object of the present invention to provide a birefringent optical film that allows a liquid crystal display to achieve excellent contrast and a wide viewing angle and does not cause coloring of the liquid crystal display.

Means for Solving Problem

The present invention provides a birefringent optical film including at least one birefringent A-layer and at least one birefringent B-layer. The birefringent A-layer has a property satisfying $ny_a \geq nz_a > nx_a$ or $nz_a > ny_a > nx_a$, and the birefringent B-layer has a property satisfying $nx_b \geq ny_b > nz_b$.

It is to be noted that $nx_a$, $ny_a$ and $nz_a$ respectively represent refractive indices in an X-axis direction, a Y-axis direction, and a Z-axis direction in the birefringent A-layer, with the X-axis direction being an axial direction that is the same as a below-mentioned X-axis direction of the birefringent B-layer, the Y-axis direction being an axial direction that is the same as a below-mentioned Y-axis direction of the birefringent B-layer, and the Z-axis direction being a thickness direction perpendicular to the X axis and the Y axis.

It also is to be noted that $nx_b$, $ny_b$ and $nz_b$ respectively represent refractive indices in the X-axis direction, the Y-axis direction, and a Z-axis direction in the birefringent B-layer, with the X-axis direction being an axial direction exhibiting a maximum refractive index within a plane of the birefringent B-layer, the Y-axis direction being an axial direction. perpendicular to the X axis within the plane, and the Z-axis direction being a thickness direction perpendicular to the X axis and the Y axis.

Effects of the Invention

By using the birefringent optical film of the present invention, it is possible to allow a liquid crystal display to achieve excellent contrast and a wide viewing angle and also to allow coloring of the liquid crystal display to be prevented from occurring.

DESCRIPTION OF THE INVENTION

Figure 1:
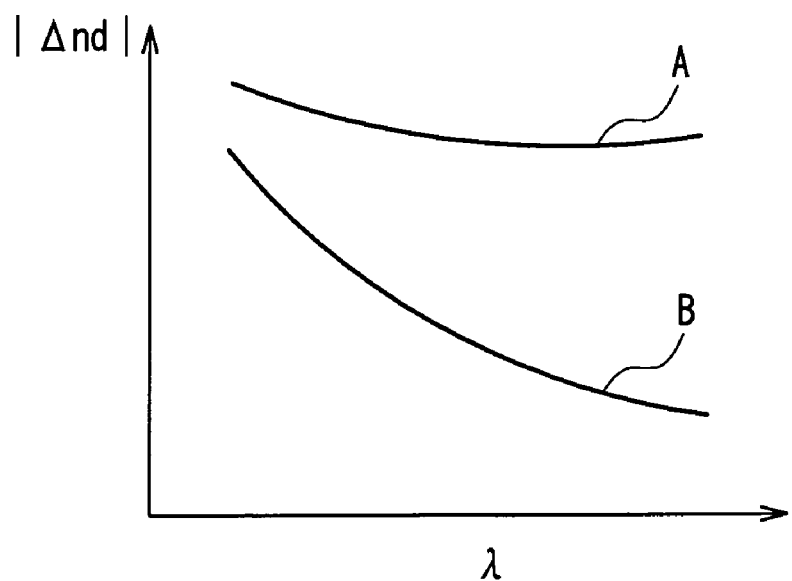
FIG. 1 is a graph showing an example of wavelength dispersion characteristics of a birefringent A-layer and a birefringent B-layer included in an optical film of the present invention.

A birefringent optical film according to the present invention configured so as to include the above-described two types of birefringent layers exhibits a broad range of And values, so that it can realize a wide viewing angle of a liquid crystal display. In particular, with regard to some kinds of liquid crystal displays whose optical characteristics could not be compensated by conventional birefringent optical films, it becomes possible to realize a wide viewing angle by the use of the birefringent optical film of the present invention.

Furthermore, the birefringent optical film of the present invention exhibits sufficiently large Rth values, so that it allows a liquid crystal display to achieve excellent contrast.

Moreover, the birefringent optical film of the present invention does not cause coloring when incorporated in a liquid crystal display.

In the birefringent optical film of the present invention, the birefringent B-layer preferably meets a requirement represented by a formula (1) below.

$$0.005 \leq \Delta n_b \leq 0.2 \tag{1}$$

In the formula (1), $\Delta n_b$ is $nx_b - nz_b$, and $nx_b$ and $nz_b$ respectively represent the refractive indices in the X-axis direction and the Z-axis direction in the birefringent B-layer, with the X-axis direction being the axial direction exhibiting the maximum refractive index within the plane of the birefringent B-layer and the Z-axis direction being the thickness direction perpendicular to the X-axis.

In the birefringent optical film of the present invention, the birefringent A-layer may be formed of at least one of a polymer exhibiting negative birefringence and a polymer exhibiting positive birefringence. Alternatively, the birefringent A-layer may be formed of a mixture of a polymer exhibiting negative birefringence and a polymer exhibiting positive birefringence.

In the birefringent optical film of the present invention, the birefringent B-layer may be formed of a polymer exhibiting positive birefringence.

Preferably, the polymer exhibiting positive birefringence is at least one polymer selected from the group consisting of polyamide, polyimide, polyester, polyetherketone, polyaryletherketone, polyamide imide and polyesterimide Preferably, the birefringent optical film of the present invention meets a requirement represented by a formula (4) below.

$$-3° \leq \text{alignment axis accuracy} \leq 3° \tag{4}$$

Note here that the alignment axis accuracy refers to variation in slow axis within a plane of the birefringent optical film.

In the birefringent optical film of the present invention, it is preferable that an in-plane retardation of the birefringent optical film as a laminate has reciprocal wavelength dispersion characteristics.

Preferably, the birefringent optical film of the present invention meets requirements represented by formulae (5) and (6) below.

$$|\Delta nd_a| > |\Delta nd_b| \quad (5)$$

$$\alpha_a \leq \alpha_b \quad (6)$$

In the formulae (5) and (6), $\Delta nd_a = (nx_a - ny_a) \cdot d_a$, $\Delta nd_b = (nx_b - ny_b) \cdot d_b$, $\alpha_a = \Delta nd_{a430\,nm} / \Delta nd_{a550\,nm}$, and $\alpha_b = \Delta nd_{b430\,nm} / \Delta nd_{b550\,nm}$.

It is to be noted that $nx_a$ and $ny_a$ respectively represent the refractive indices in the X-axis direction and the Y-axis direction in the birefringent A-layer, with the X-axis direction being the axial direction that is the same as the X-axis direction of the birefringent B-layer and the Y-axis direction being the axial direction that is the same as the Y-axis direction of the birefringent B-layer, and $d_a$ represents a thickness of the birefringent A-layer.

It also is to be noted that $nx_b$ and $ny_b$ respectively represent the refractive indices in the X-axis direction and the Y-axis direction in the birefringent B-layer, with the X-axis direction being the axial direction exhibiting the maximum refractive index within the plane of the birefringent B-layer and the Y-axis direction being the axial direction perpendicular to the X-axis within the plane, and db represents a thickness of the birefringent B-layer.

It also is to be noted that $\Delta nd_{a430\,nm}$ and $\Delta nd_{a550\,nm}$ respectively represent $\Delta nd_a$ values of the birefringent A-layer at wavelengths of 430 nm and 550 nm.

It also is to be noted that $\Delta nd_{b430\,nm}$ and $\Delta nd_{b550\,nm}$ respectively represent $\Delta nd_b$ values of the birefringent B-layer at the wavelengths of 430 nm and 550 nm.

A laminated polarizing plate according to the present invention is a laminated polarizing plate including a birefringent optical film of the present invention.

A liquid crystal panel according to the present invention is a liquid crystal panel including a liquid crystal cell and an optical member. In the liquid crystal panel, the optical member is disposed on at least one surface of the liquid crystal cell and the optical member is a laminated polarizing plate of the present invention.

A liquid crystal display of the present invention is a liquid crystal display including a liquid crystal panel of the present invention.

An image display according to the present invention is an image display including a birefringent optical film of the present invention or a laminated polarizing plate of the present invention.

In the present invention, it is necessary that the birefringent A-layer has a property satisfying $ny_a \geq nz_a > nx_a$ or $nz_a > ny_a > nx_a$. The reason for this is that the birefringent A-layer with such a property can reduce light leakage in oblique directions effectively when it is incorporated in an image display.

Preferably, the birefringent A-layer with such a property is formed of a polymer exhibiting negative birefringence, a polymer exhibiting positive birefringence, or a mixture of a polymer exhibiting negative birefringence and a polymer exhibiting positive birefringence. More preferably, the birefringent A-layer is formed of a polymer exhibiting negative birefringence or a mixture of a polymer exhibiting negative birefringence and a polymer exhibiting positive birefringence.

Note here that the polymer exhibiting negative birefringence refers to a polymer that forms a polymer film exhibiting a minimum refractive index in a stretching direction when it is stretched.

The polymer exhibiting negative birefringence may be a homopolymer based on a single monomer such as polystyrene, an acrylic substance, or polymethyl methacrylate. Alternatively, a copolymer of such a homopolymer and one or more other polymers may be used as the polymer exhibiting negative birefringence, in order to improve a mechanical property of the resultant film. Generally known examples of such a copolymer include styrene-maleic anhydride copolymers, styrene-maleimide copolymers, copolymers including an olefin unit and an acrylic substance unit, and copolymers including a nitrile unit and a styrene unit. Examples of the nitrile compound include: α-substituted unsaturated nitrile such as acrylonitrile and methacrylonitrile; and nitrile compounds including an α,β-disubstituted olefine-type unsaturated bond such as fumaronitrile. On the other hand, the styrene compound may be an unsubstituted or substituted styrene compound, such as styrene, vinyltoluene, methoxystyrene, chlorostyrene or α-methylstyrene.

Note here that the polymer exhibiting positive birefringence refers to a polymer that forms a polymer film exhibiting a maximum refractive index in a stretching direction when it is stretched.

The polymer exhibiting positive birefringence may be a resin based on acetate, polyester, polyethersulfone, polycarbonate, polyamide, polyimide, polynorbornene, polyolefin, polyethylene oxide, or polyphenylene ether. Alternatively, in order to improve a heat resistance and/or a mechanical strength of the resultant film, a copolymer including an alkene unit in combination with a substituted or unsubstituted maleimide unit or a substituted or unsubstituted vinyl unit can be used as the polymer exhibiting positive birefringence. Examples of such a copolymer include an olefin-maleimide copolymer.

It is preferable that the polymer exhibiting positive birefringence is a non-liquid crystal polymer such as polyamide, polyimide, polyester, polyetherketone, polyamide imide, polyesterimide, or the like because of its excellent heat resistance, chemical resistance, transparency, and hardness. It may be possible to use one of these non-liquid crystal polymers alone or a mixture of two or more polymers having different functional groups, for example, a mixture of polyaryletherketone and polyamide. Among these non-liquid crystal polymers, polyimide is particularly preferable because of its high transparency, high aligning property, and high stretching property.

The molecular weight of the non-liquid crystal polymer is not particularly limited, but the weight-average molecular weight (Mw) thereof preferably ranges from 1,000 to 1,000,000 and more preferably ranges from 2,000 to 500,000.

As the polyimide, it is preferable to use a polyimide that has a high in-plane aligning property and is soluble in an organic solvent. Specifically, examples of such a polyimide include a condensation polymer product of 9,9-bis(aminoaryl) fluorene and an aromatic tetracarboxylic dianhydride disclosed in JP 2000-511296 A, i.e., a polymer containing at least one repeating unit represented by the general formula (1) below.

[Chemical Formula 1]

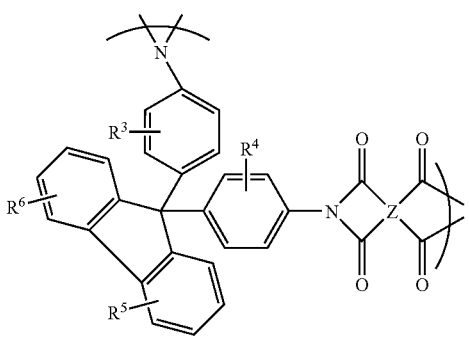

(1)

In the above general formula (1), $R^3$ to $R^6$ are at least one substituent selected independently from the group consisting of a hydrogen atom, a halogen atom, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of a halogen atom, a phenyl group, a phenyl group substituted with 1 to 4 halogen atoms or a $C_{1-10}$ alkyl group, and a $C_{1-10}$ alkyl group.

In the above general formula (1), Z is, for example, a $C_{6-20}$ quadrivalent aromatic group, and preferably is a pyromellitic group, a polycyclic aromatic group, a derivative of a polycyclic aromatic group, or a group represented by the general formula (2) below.

[Chemical Formula 2]

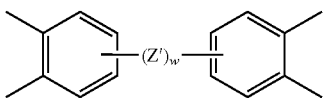

(2)

In the general formula (2) above, Z' is, for example, a covalent bond, a $C(R^7)_2$ group, a CO group, an O atom, an S atom, an $SO_2$ group, an $Si(C2H_5)_2$ group, or an $NR^8$ group. When there are plural Z's, they may be the same or different. Also, w is an integer from 1 to 10. $R^7$s independently are hydrogen or $C(R^9)_3$. $R^8$ is a hydrogen atom, an alkyl group having from 1 to about 20 carbon atoms, or a $C_{6-20}$ aryl group, and when there are plural $R^8$s, they may be the same or different. $R^9$s independently are a hydrogen atom, a fluorine atom, or a chlorine atom.

The above-mentioned polycyclic aromatic group may be, for example, a quadrivalent group derived from naphthalene, fluorene, benzofluorene, or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof, and halogen atoms such as an F atom and a Cl atom.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the general formula (5) below is a preferable mode of the homopolymer represented by the general formula (3).

[Chemical Formula 3]

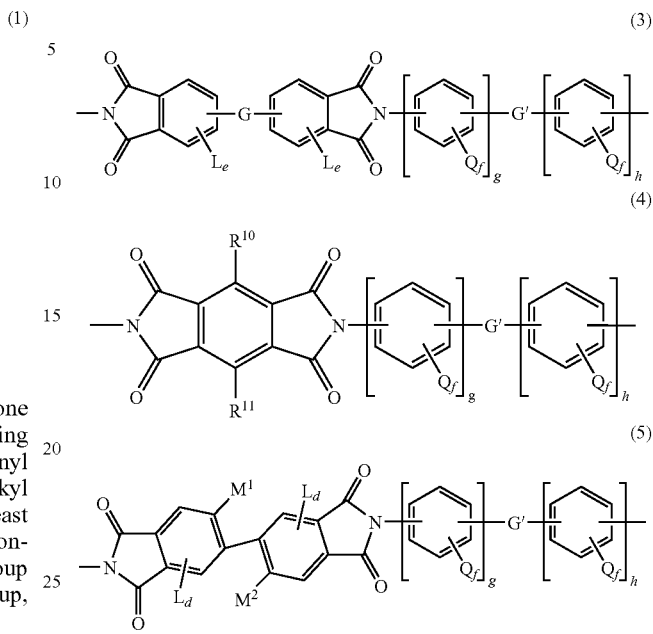

(3)

(4)

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is a halogen atom), a CO group, an O atom, an S atom, an $SO_2$ group, an $Si(CH_2CH_3)_2$ group, and an $N(CH_3)$ group, and G and G' may be the same or different.

In the above general formulae (3) and (5), L is a substituent, and d and e indicate the number of substitutions therein. L is, for example, a halogen atom, a $C_{1-3}$ alkyl group, a halogenated $C_{1-3}$ alkyl group, a phenyl group, or a substituted phenyl group, and when there are plural Ls, they may be the same or different. The above-mentioned substituted phenyl group may be, for example, a substituted phenyl group having at least one substituent selected from the group consisting of a halogen atom, a $C_{1-3}$ alkyl group and a halogenated $C_{1-3}$ alkyl group. Also, the above-mentioned halogen atom may be, for example, a fluorine atom, a chlorine atom, a bromine atom, or an iodine atom. d is an integer from 0 to 2, and e is an integer from 0 to 3.

In the above general formulae (3) to (5), Q is a substituent, and f indicates the number of substitutions therein. Q may be, for example, an atom or a group selected from the group consisting of a hydrogen atom, a halogen atom, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen atom may be, for example, a fluorine atom, a chlorine atom, a bromine atom, or an iodine atom. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above general formula (4), $R^{10}$ and $R^{11}$ are groups selected independently from the group consisting of a hydrogen atom, a halogen atom, a phenyl group, a substituted phenyl group, an alkyl group, and a substituted alkyl group. It is particularly preferable that $R^{10}$ and $R^{11}$ independently are a halogenated alkyl group.

In the above general formula (5), $M^1$ and $M^2$ may be the same or different and, for example, a halogen atom, a $C_{1-3}$ alkyl group, a halogenated $C_{1-3}$ alkyl group, a phenyl group, or a substituted phenyl group. The above-mentioned halogen atom may be, for example, a fluorine atom, a chlorine atom, a bromine atom, or iodine. The above-mentioned substituted phenyl group may be, for example, a substituted phenyl group having at least one substituent selected from the group consisting of a halogen atom, a $C_{1-3}$ alkyl group, and a halogenated $C_{1-3}$ alkyl group.

A specific example of polyimide represented by the general formula (3) includes polyimide represented by the general formula (6) below.

[Chemical Formula 4]

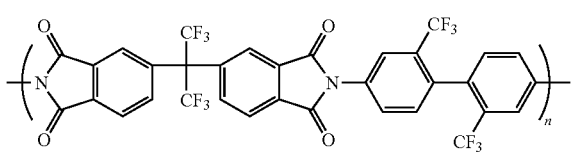

(6)

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride, or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl) pyromellitic dianhydride, 3,6-dibromopyromellitic dianhydride, or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride, or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride, or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride, or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride, or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride, and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4', 5,5'-biphenyl tetracarboxylic dianhydride, and further preferably is 2,2'-bis(trifluoromethyl) 4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine, and other aromatic diamines.

The benzenediamine may be, for example, diamine selected from the group consisting of benzenediamines such as o-, m-, and p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine, and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether, or 4,4'-diaminodiphenylsulfone.

The polyetherketone may be, for example, polyaryletherketone represented by the general formula (7) below, which is disclosed in JP 2001-49110 A.

[Chemical Formula 5]

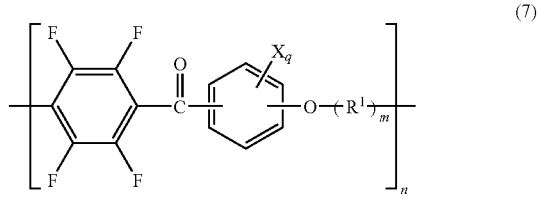

(7)

In the above general formula (7), X is a substituent, and q is the number of substitutions therein. X is, for example, a halogen atom, a lower alkyl group, a halogenated alkyl group, a lower alkoxy group, or a halogenated alkoxy group, and when there are plural Xs, they may be the same or different.

The halogen atom may be, for example, a fluorine atom, a bromine atom, a chlorine atom, or an iodine atom, and among these, a fluorine atom is preferable. The lower alkyl group preferably is a $C_{1-6}$ lower straight chain alkyl group or a $C_{1-6}$ lower branched chain alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group, or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group, or a tert-butoxy group, and particularly preferably is a methoxy group or an ethoxy group. The halogenated alkoxy group may be, for example, a halide of the above-mentioned lower alkoxy group such as a trifluoromethoxy group.

In the above general formula (7), q is an integer from 0 to 4. In the general formula (7), it is preferable that q=0 and a carbonyl group and an oxygen atom of an ether that are bonded to both ends of a benzene ring are present at para positions.

Also, in the above general formula (7), $R^1$ is a group represented by the general formula (8) below, and m is an integer of 0 or 1.

[Chemical Formula 6]

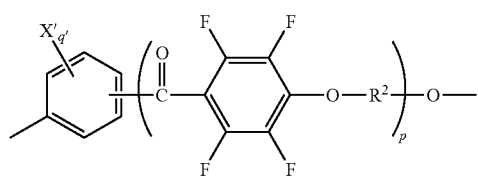

(8)

In the above general formula (8), X' is a substituent and is the same as X in the general formula (7), for example. In the general formula (8), when there are plural X's, they may be the same or different. q' indicates the number of substitutions in the X' and is an integer from 0 to 4, preferably, q'=0. In addition, p is an integer of 0 or 1.

In the general formula (8), $R^2$ is a divalent aromatic group. This divalent aromatic group is, for example, an o-, m-, or p-phenylene group or a divalent group derived from naphthalene, biphenyl, anthracene, o-, m-, or p-terphenyl, phenanthrene, dibenzofuran, biphenyl ether, or biphenyl sulfone. In these divalent aromatic groups, hydrogen that is bonded directly to the aromatic may be substituted with a halogen atom, a lower alkyl group, or a lower alkoxy group. Among them, the $R^2$ preferably is an aromatic group selected from the group consisting of the general formulae (9) to (15) below.

[Chemical Formula 7]

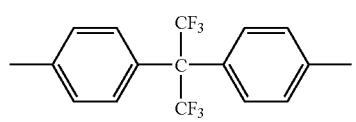

(9)

-continued

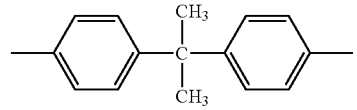

(10)

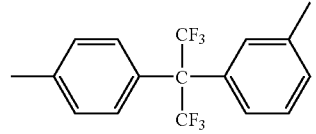

(11)

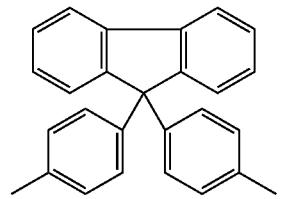

(12)

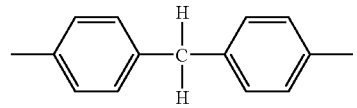

(13)

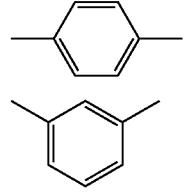

(14)

(15)

In the above general formula (7), the R' preferably is a group represented by the general formula (16) below, wherein $R^2$ and p are equivalent to those in the above-noted general formula (8).

[Chemical Formula 8]

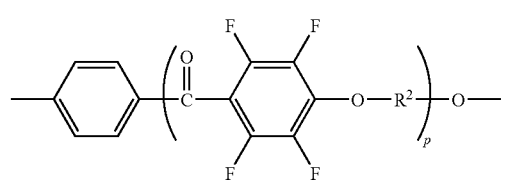

(16)

Furthermore, in the general formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the general formula (7) is fluorine and an end on an oxyalkylene group side thereof is a hydrogen atom. Such a polyaryletherketone can be represented by the general formula (17) below, for example. In the general formula (17) below, n indicates a degree of polymerization as in the general formula (7).

[Chemical Formula 9]

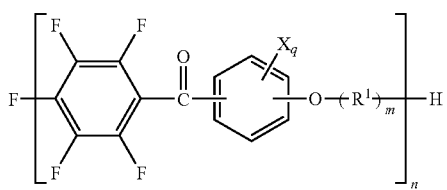
(17)

Specific examples of the polyaryletherketone represented by the general formula (7) may include those represented by the general formulae (18) to (21) below, wherein n indicates a degree of polymerization as in the general formula (7).

[Chemical Formula 10]

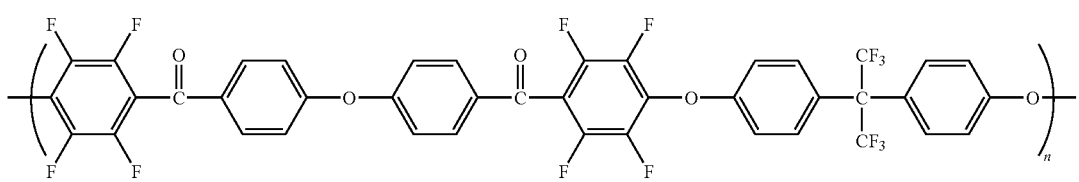
(18)

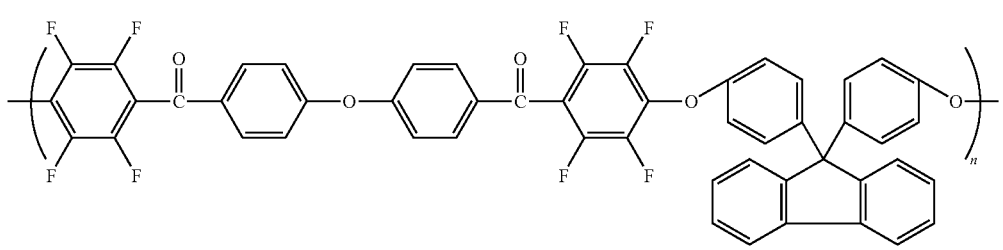
(19)

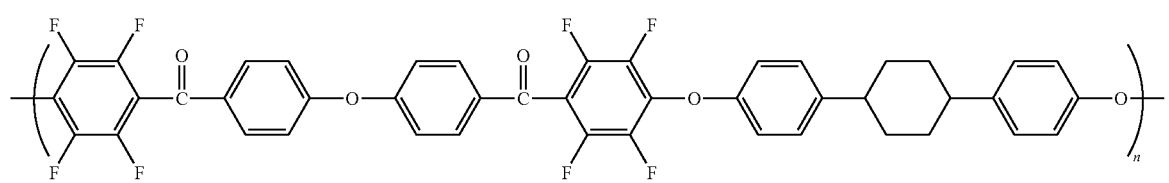
(20)

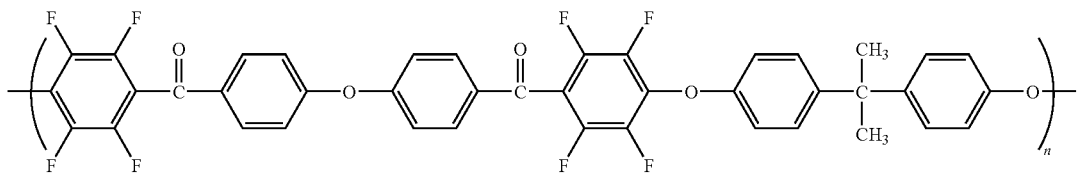
(21)

Other than the above, the polyamide or polyester may be, for example, polyamide or polyester described by JP 10(1998)-508048 A, and their repeating units can be represented by the general formula (22) below.

[Chemical Formula 11]

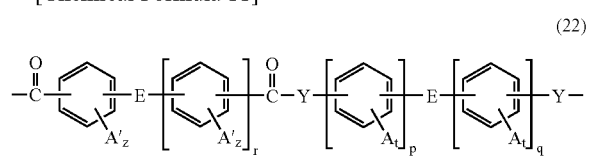
(22)

In the above general formula (22), Y is an O atom or an NH group. E is, for example, at least one group selected from the group consisting of a covalent bond, a $C_2$ alkylene group, a halogenated $C_2$ alkylene group, a $CH_2$ group, a $C(CX_3)_2$ group (wherein X is a halogen atom or a hydrogen atom), a CO group, an O atom, an S atom, an $SO_2$ group, an $Si(R)_2$ group, and an N(R) group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above general formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, a hydrogen atom, a halogen atom, a $C_{1-3}$ alkyl group, a halogenated $C_{1-3}$ alkyl group, an alkoxy group represented by OR (wherein R is the group defined above), an aryl group, a substituted aryl group by halogenation or the like, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof When there are plural As, they may be the same or different. The above-mentioned A' is selected from the group consisting of, for example, halogen, a $C_{1-3}$ alkyl group, a halogenated $C_{1-3}$ alkyl group, a phenyl group, and a substituted phenyl group and when there are plural A's, they may be the same or different. A substituent on a phenyl ring of the substituted phenyl group can be, for example, a halogen atom, a $C_{1-3}$ alkyl group, a halogenated $C_{1-3}$ alkyl group, or a combination thereof The t is an integer from 0 to 4, and the z is an integer from 0 to 3.

Among the repeating units of the polyamide or polyester represented by the general formula (22) above, the repeating unit represented by the general formula (23) below is preferable.

[Chemical Formula 12]

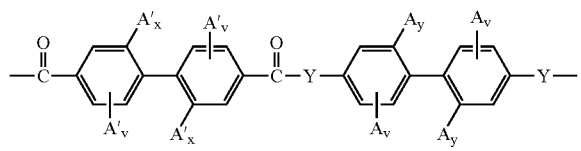

(23)

In the general formula (23), A, A', and Y are those defined by the general formula (22), and v is an integer from 0 to 3, preferably is an integer from 0 to 2. Although each of x and y is 0 or 1, not both of them are 0.

Note here that, among the above-described examples of a polymer exhibiting positive birefringence, a polyester resin is preferable as a polymer exhibiting positive birefringence for forming the birefringent A-layer.

Furthermore, in a mixture of a polymer exhibiting negative birefringence and a polymer exhibiting positive birefringence used for forming the birefringent A-layer, a mixing ratio of these polymers can be determined suitably so as to obtain the birefringent A-layer with a property satisfying $ny_a \geq nz_a > nx_a$ or $nz_a > ny_a > nx_a$.

Preferably, the polymer exhibiting negative birefringence and the polymer exhibiting positive birefringence contained in the mixture for forming the birefringent A-layer are compatible with each other. Examples of the combination of the polymer exhibiting negative birefringence and the polymer exhibiting positive birefringence include combinations of: polymethyl methacrylate and polyethylene oxide; polystyrene and polyphenylene ether; a styrene-maleimide copolymer and polyphenylene ether; an olefin-maleimide copolymer and an acrylonitrile-styrene copolymer; a styrene-maleic anhydride copolymer and polycarbonate; and polystyrene and polycarbonate.

Note here that anyone having an ordinary skill in the art can prepare the birefringent A-layer with a property satisfying $ny_a \geq nz_a > nx_a$ or $nz_a > ny_a > nx_a$ by, for example, selecting a suitable type of polymer out of the above-described various polymers and setting the film producing conditions such as stretching or shrinking suitably, without conducting any undue experimentation.

Next, in the present invention, it is necessary that the birefringent B-layer has a property satisfying $nx_b \geq ny_b > nz_b$. The reason for this is that the birefringent B-layer with such a property is suitable for optical compensation of liquid crystal molecules that are in tilt alignment, bend alignment, hybrid alignment, homeotropic alignment or the like in a liquid crystal cell.

The birefringent B-layer with such a property preferably is formed of a-polymer exhibiting positive birefringence. Among the above-described various polymers exhibiting positive birefringence, polyimide is more preferable for forming the birefringent B-layer, because it exhibits high birefringence.

It is preferable that the birefiingent B-layer meets the requirement represented by the formula (1) below, because this allows excellent compensation of the black display to be achieved in a VA mode or an OCB mode liquid crystal cell, for example.

$$0.005 \leq \Delta n_b \leq 0.2 \quad (1)$$

In the above formula (1), $\Delta n_b$ is as defined above. It is more preferable that the birefringent B-layer satisfies $0.01 \leq \Delta n_b \leq 0.15$, still more preferably $0.015 \leq \Delta n_b \leq 0.1$.

Note here that anyone having an ordinary skill in the art can prepare the birefringent B-layer with a property satisfying $nx_b \geq ny_b > nz_b$ by, for example, selecting a suitable type of polymer out of the above-described various polymers and setting the film producing conditions such as stretching or shrinking suitably, without conducting any undue experimentation.

The birefringent optical film of the present invention includes at least one birefringent A-layer and at least one birefringent B-layer. Because the birefringent optical film configured as such has a broad range of $\Delta nd$ values as well as large Rth values, it allows a liquid crystal display or the like to achieve a wide viewing angle and excellent contrast when incorporated therein.

In the present invention, the thickness of the birefringent A-layer is not particularly limited, but may be, for example, 1 to 500 μm, preferably 1 to 300 μm, and more preferably 1 to 200 μm.

Also, the thickness of the birefringent B-layer is not particularly limited, but may be, for example, 0.1 to 30 μm, preferably 0.3 to 25 μm, and more preferably 0.5 to 20 μm.

The birefringent A-layer may be laminated on one or both surfaces of the birefringent B-layer, for example. The number of the birefringent A-layers may be one or at least two for each surface. Moreover, the birefringent A-layer may be laminated directly on the birefringent B-layer, or alternatively, an additional layer(s) may be provided between the birefringent A-layer and the birefringent B-layer. The same applies to the birefringent B-layer.

Furthermore, the birefringent optical film of the present invention preferably meets a requirement represented by the formula (4) below, for example. The birefringent optical film of the present invention meeting such a requirement does not deteriorate the front contrast of a liquid crystal display or the like when it is provided therein.

$$-3° \leq \text{alignment axis accuracy} \leq 3° \quad (4)$$

The alignment axis accuracy is as defined above.

It is more preferable that the birefringent optical film satisfies $-2° \leq$ alignment axis accuracy $\leq 2°$, still more preferably $-1.5° \leq$ alignment axis accuracy $\leq 1.5°$. In particular, when the birefringent optical film is used in a VA mode liquid crystal cell, it is preferable that the birefringent optical film satisfies $-2° \leq$ alignment axis accuracy $\leq 2°$. In the present invention, it is preferable to shrink or stretch the laminate of the birefringent A-layer and the birefringent B-layer, because this reduces variation in axis accuracy.

Moreover, the birefringent optical film of the present invention preferably has reciprocal wavelength dispersion characteristics. When the birefringent optical film of the present invention has reciprocal wavelength dispersion characteristics, the occurrence of display coloring in a liquid crystal display or the like when the birefringent optical film is incorporated therein can further be prevented. Note here that the reciprocal wavelength dispersion characteristics show a tendency that the in-plane retardation value (Δnd) increases as the wavelength becomes longer. The birefringent optical film of the present invention with reciprocal wavelength dispersion characteristics can be used as a reciprocal dispersion film.

Figure 2:
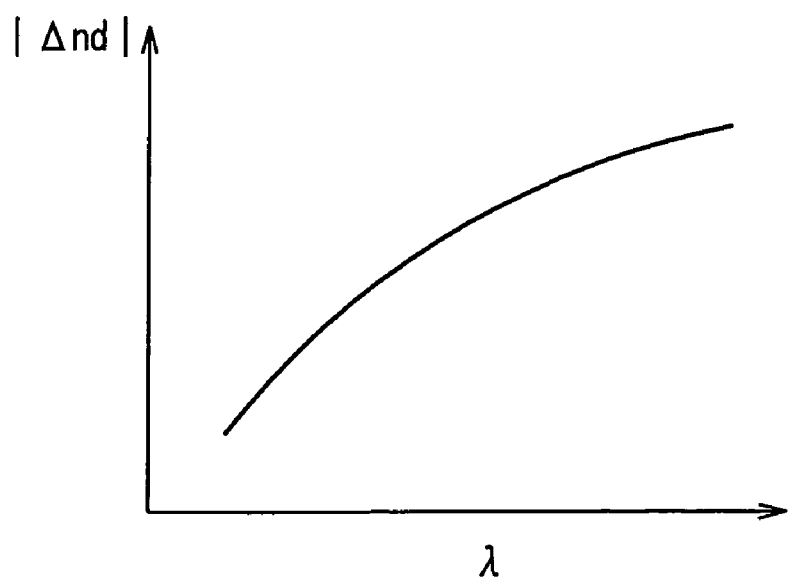
FIG. 2 is a graph showing an example of wavelength dispersion characteristics (reciprocal wavelength dispersion) of an optical film of the present invention.

Preferably, the birefringent optical film meets the requirements represented by the following formulae (5) and (6), for example. This is because, when the birefringent optical film meets the requirements represented by the formulae (5) and (6), the birefringent optical film has reciprocal wavelength dispersion characteristics. More specifically, in the present invention, the birefringent A-layer and the bireflingent B-layer are arranged so that their slow axes are orthogonal to each other, so that the in-plane retardation Δnd of the optical film as a whole corresponds to a difference between the in-plane retardation $\Delta nd_a$ of the birefringent A-layer and the in-plane retardation $\Delta nd_b$ of the birefringent B-layer ($\Delta nd = |\Delta nd_a - \Delta nd_b|$). Furthermore, as shown in the graph of FIG. 1, the change A in wavelength dispersion characteristics of the absolute value of the in-plane retardation $\Delta nd_a$ of the birefringent A-layer is smaller than the change B in the same of the birefringent B-layer. Therefore, as shown in the graph of FIG. 2, the wavelength dispersion characteristics of the optical film of the present invention corresponds to the difference between the in-plane retardation of the birefringent A-layer and that of the birefringent B-layer. As a result, the optical film of the present invention has reciprocal wavelength dispersion characteristics. It is to be noted here that the graphs of FIGS. 1 and 2 are intended merely to explain wavelength dispersion characteristics, and the present invention is by no means limited to these graphs.

$$|\Delta nd_a| > |\Delta nd_b| \tag{5}$$

$$\alpha_a < \alpha_b \tag{6}$$

In the formulae (5) and (6), $\Delta nd_a$, $\Delta nd_b$, $\alpha_a$ and $\alpha_b$ are as defined above.

It is possible to allow the birefringent optical film of the present invention to meet the requirements represented by the formula (5) and (6) by, for example, selecting the types of materials for forming the birefringent A-layer and the birefringent B-layer. For example, when polyimide is selected as a material for forming the birefringent B-layer, the resultant birefringent B-layer will have significant wavelength dispersion. More specifically, Δnd of the birefringent B-layer becomes greater at a shorter wavelength and smaller at a longer wavelength. As a result, regardless of the type of the material for forming birefringent A-layer, Δnd of the laminate of these layers exhibits reciprocal wavelength dispersion characteristics.

The birefringent optical film of the present invention can be produced by, for example, providing a birefringent A-layer and then forming a birefringent B-layer on the birefringent A-layer.

First, the birefringent A-layer is provided.

The birefringent A-layer is formed, for example, using a polymer exhibiting negative birefringence, a polymer exhibiting positive birefringence, or a mixture of a polymer exhibiting negative birefringence and a polymer exhibiting positive birefringence. The polymers are as described above.

For example, the birefringent A-layer can be formed using a polymer exhibiting negative birefringence, a polymer exhibiting positive birefringence, or a mixture of a polymer exhibiting negative birefringence and a polymer exhibiting positive birefringence according to a conventionally known method such as extrusion, a calender method, a solvent casting method or film flow-expanding.

Hereinafter, a method of forming the birefringent A-layer by film flow-expanding will be described as an example.

For example, a solution or melt of a polymer for forming the birefringent A-layer is coated on a suitable base and then is hardened by suitable means (such as heating or cooling). Thereafter, the material thus hardened is peeled off from the base, thus obtaining a film. There is no particular limitation to the base, and an inorganic compound base (an SUS belt, a copper sheet, a glass sheet, an Si wafer or the like), a polymer film, a metal sheet or the like can be used.

Specifically, a material for forming a polymer film serving as the base may be, for example, a polyolefin (polyethylene, polypropylene or the like), amorphous polyolefin, polyimide, polyamide imide, polyamide, polyetherimide, polyether ether ketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, polypropylene, a cellulose-based polymer (triacetylcellulose (TAC) or the like), an epoxy resin, a phenol resin, a norbornen-based resin, a polyester resin, a polyether-sulfone resin, a polysulfone resin, a polycarbonate resin, a polyamide resin, a polyimide resin, a polyolefin resin, an acrylic resin, a polynorbornene resin, a polyarylate resin, a polystyrene resin, a polyvinyl alcohol resin, a polyvinyl chloride resin, a polyvinylidene chloride resin, a polyacrylic resin, a mixture of these materials or the like.

Furthermore, other than the above, a liquid crystal polymer or the like also can be used as a material for forming the base. Moreover, for example, a mixture formed of a thermoplastic resin whose side chain has a substituted or unsubstituted imido group and a thermoplastic resin whose side chain has a substituted or unsubstituted phenyl group and a nitrile group, which is described in JP 2001-343529 A (WO 01/37007) also can be used. Specific examples thereof include a mixture of an alternating copolymer of isobutene and N-methyl maleimide and an acrylonitrile-styrene copolymer.

Among these materials for forming the base, for example, polyethylene, polypropylene, polyethylene terephthalate, polyethylene naphthalate, polymethyl methacrylate, polycarbonate, polyarylate, cellulose-based polymers, polyether sulfone, norbornen-based resins, a mixture of an alternating copolymer of isobutene and N-methyl maleimide and an acrylonitrile-styrene copolymer, a mixture formed of a thermoplastic resin whose side chain has a substituted or unsubstituted imido group and a thermoplastic resin whose side chain has a substituted or unsubstituted phenyl group and a nitrile group are preferable. The polymer film can be produced using any of the above-mentioned resins by extrusion, a calender method, a solvent casting method or the like. Moreover, the polymer film also may be stretched (uniaxially, biaxially, or the like), and a stretched polymer film is preferable. As the polymer film, a polymer film that has been subjected to a surface treatment such as, for example, a treatment for imparting hydrophilicity, a treatment for imparting hydrophobicity, or a treatment for reducing the solubility of the base also may be used. The thickness of the polymer film is generally not less than 10 μm and not more than 200 μm, preferably not less than 20 μm and not less than 150 μm, and particularly preferably not less than 30 μm and not more than 100 μm.

There is no particular limit to a concentration of a polymer in the polymer solution for forming the birefrin gent A-layer. For example, in order to obtain the viscosity facilitating coating, with respect to 100 parts by weight of a solvent, the content of the polymer is, for example, 0.5 to 50 parts by weight, preferably 1 to 40 parts by weight, and more preferably 2 to 30 parts by weight. With respect to 100 parts by weight of a solvent, the content of the polymer preferably is not less than 0.5 parts by weight because this can provide the viscosity appropriate for coating. Further, the content of the polymer preferably is not more than 50 parts by weight because this can provide the viscosity that allows a smooth coated surface to be formed.

The solvent for the polymer solution for forming the birefringent A-layer is not particularly limited as long as it can dissolve the polymer, and can be determined suitably according to a type of the polymer. Specific examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or in combination of two or more. Further, preferably, the solvent is of a type that does not corrode the base.

In the polymer solution for forming the birefringent A-layer, for example, various additives such as a stabilizer, a plasticizer, metal, a compatibilizer, and the like further may be blended as necessary.

When the above-described additives are blended in the polymer solution for forming the birefringent A-layer, the blend amount ranges, for example, from 0 wt % to 50 wt %, preferably from 0 wt % to 30 wt %, with respect to the polymer.

Moreover, the polymer solution for forming the birefringent A-layer may contain other resins. Examples of other resins include resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the above-described other resins or the like are blended in the polymer solution for forming the birefringent A-layer as mentioned above, the blend amount ranges, for example, from 0 wt % to 50 wt %, preferably from 0 wt % to 30 wt %, with respect to the polymer.

The coating of polymer solution for forming the birefringent A-layer can be carried out by a suitable method such as spin coating, roller coating, flow coating, die coating, blade coating, printing, dip coating, film flow-expanding, bar coating, gravure printing or the like. In the coating, polymer layers can be superimposed as required.

There is no particular limitation to the polymer melt for forming the birefringent A-layer. Examples of the melt include a melt in which a polymer as described above is melted by heating. The polymer melt for forming the birefringent A-layer further may contain, for example, various additives such as the above-mentioned stabilizer, plasticizer, metal and the like and other resins as required.

Then, the coating layer of the polymer for forming the birefringent A-layer on the base is hardened, thereby forming a layer on one surface of the base.

The hardening method is not particularly limited as long as it allows the polymer for forming the birefringent A-layer to be hardened so as to form the layer. Examples of the method include air-drying and drying by heating. The conditions under which the hardening is carried out also can be determined suitably according to, for example, the type of the polymer for forming the birefringent A-layer, and in the case of using a solution, the type of the solvent. For example, a temperature at which the hardening is carried out is generally from 40° C. to 250° C., preferably from 50° C. to 200° C. The hardening may be carried out at a constant temperature or a temperature raised or lowered in a step-wise manner. A hardening time also is not particularly limited. In the case of using a polymer solution for forming the birefringent A-layer, it is necessary to employ a condition that allows a solvent to be removed by hardening. The hardening time is, generally 10 seconds to 60 minutes, and preferably 30 seconds to 30 minutes.

The thickness of the layer formed on the base is not particularly limited, but may be, for example, 0.2 to 100 μm, preferably 0.5 to 50 μm, and more preferably 1 to 20 μm.

In the above-described manner, the birefringent A-layer can be formed on the base. This birefringent A-layer is peeled off from the base and is used as a film in the following steps. However, depending on the type of the base, it is not necessary to peel off the birefringent A-layer from the base, and the birefringent A-layer integrated with the base may be used in the following steps.

Examples of the method of peeling off the film layer from the base include: mechanically peeling off the film layer using a roller or the like; immersing the laminate in a poor solvent for all the materials forming the laminate and then mechanically peeling off the film layer; peeling off the film layer by applying ultrasonic waves to the laminate in the poor solvent; and subjecting the laminate to temperature change, thereby causing the film layer to be peeled off due to the difference in thermal expansion coefficient between the base and the film layer. The peelability of the film layer from the base varies depending on a material used for forming the film layer and adhesion between the film layer and the base. Thus, the most suitable peeling method may be employed as appropriate.

Next, a birefringent B-layer is disposed on the birefringent A-layer to obtain a birefringent optical film of the present invention.

For example, a solution or melt of a polymer exhibiting positive birefringence, for example, is coated on the birefringent A-layer and is hardened, thereby forming a birefringent B-layer on the birefringent A-layer. Thus, the birefringent optical film of the present invention can be obtained. When the birefringent A-layer includes a polymer exhibiting positive birefringence, a polymer exhibiting positive birefringence used for forming the birefringent B-layer may be the same as or different from the polymer used for forming the birefringent A-layer.

Note here that, with regard to the formation of the birefringent B-layer, the concentration of a polymer in a polymer solution for forming the birefringent B-layer, a solvent of a polymer solution for forming the birefringent B-layer, additives and other resins that may optionally be contained in a solution or melt of a polymer for forming the birefringent B-layer, the blend ratio of additives and other resins with respect to a polymer for forming the birefringent B-layer, the method of coating a polymer solution for forming the birefringent B-layer, the method of coating a polymer melt for forming the birefringent B-layer, and the method and conditions for hardening a solution or melt of a polymer for forming the birefringent B-layer are the same as those described with regard to the birefringent A-layer.

Also, the birefringent B-layer can be formed separately by, for example, coating a solution or melt of a polymer exhibiting positive birefringence on a suitable base, hardening the solution or melt by heating or cooling, and then peeling off the hardened material from the base. The birefringent B-layer formed separately in the above-described manner may be bonded to the birefringent A-layer with an adhesive or a pressure sensitive adhesive, thereby forming a birefringent optical film of the present invention including the birefringent A-layer and the birefringent B-layer.

The adhesive or the pressure sensitive adhesive used for bonding the birefringent A-layer and the birefringent B-layer is not particularly limited, but preferably is one having excellent optical transparency and appropriate sticking characteristics such as wettability, cohesiveness, and adhesiveness. The adhesive can be, for example, a polymer adhesive based on acrylic substances, vinyl alcohol, silicone, polyester, polyurethane or polyether, or a rubber-based adhesive. It also is possible to use an adhesive containing a water-soluble cross-linking agent of vinyl alcohol-based polymers such as boric acid, borax, glutaraldehyde, melamine and oxalic acid.

Examples of the pressure-sensitive adhesive include those prepared appropriately based on polymers such as an acrylic polymer, a silicone-based polymer, polyester, polyurethane, polyether, and synthetic rubber.

Also, the birefringent optical film of the present invention can be produced by, for example, preparing a precursor layer of the birefringent A-layer, forming a precursor layer of the birefringent B-layer thereon, and then stretching or shrinking the thus-obtained laminate.

The precursor layer of the birefringent A-layer can be formed of the same material and with the same forming method as those of the birefringent A-layer described above. Also, the precursor layer of the birefringent B-layer can be formed of the same material and with the same forming method as those of the birefringent B-layer described above. The only difference between the birefringent A-layer and the precursor layer thereof is that the birefringent A-layer has, for example, a property satisfying $ny_a \geq nz_a > nx_a$ or $nz_a > ny_a > nx_a$, whereas the precursor layer thereof does not have such a property. In such a case, the birefringent A-layer may be formed by stretching or shrinking the precursor layer of the birefringent A-layer so that the property of the precursor layer is changed to a desired property. Also, the precursor layer of the birefringent B-layer differ from the birefringent B-layer only in that it does not have a property satisfying $nx_b \geq ny_b > nz_b$. Thus, as described above, it is possible to form the birefringent B-layer by stretching or shrinking the precursor layer of the birefringent B-layer so as to obtain a desired property.

The stretching method is not particularly limited, and may be uniaxial stretching or biaxial stretching. Also, the stretching direction may be either a film MD direction or a film TD direction of the laminate. The specific stretching method also is not particularly limited, and any known methods can be used as appropriate. Examples of the stretching method include stretching along the machine direction according to methods using rollers, tenter transverse stretching, freend longitudinal stretching in which the laminate is stretched uniaxially in the MD direction, fixed-end transverse stretching in which the laminate is stretched uniaxially in the TD direction with the MD direction being fixed, simultaneous biaxial stretching in which the laminate is stretched in the TD direction while being shrunk in the MD direction, biaxial stretching in which the laminate is stretched in the MD direction and then further is stretched in the TD direction.

When the laminate is stretched in the MD direction with the TD direction being fixed, molecular alignment in the film in-plane direction can be controlled more easily. Thus, it is possible to obtain a stretched film that exhibits small Δnd values.

Furthermore, when the laminate is stretched in the TD direction with the MD direction being fixed by, for example, fixed-end transverse stretching, it is possible to obtain a stretched film that exhibits small Δnd values. Moreover, when the laminate that has been stretched in the TD direction then is shrunk in the direction opposite to the TD direction, it is possible to obtain a stretched film that exhibits improved Δnd, Rth and alignment axis accuracy.

Furthermore, when the laminate is stretched in the TD direction while being shrunk in the MD direction, it is possible to obtain a stretched film that exhibits larger Δnd values and still more improved alignment axis accuracy than those of the stretched film obtained by fixed-end transverse stretching.

Furthermore, when the laminate is stretched in the TD direction, the resultant birefringent optical film can be bonded to a polarizing plate or a polarizer easily so that the longer sides of the birefringent optical film and the polarizing plate or polarizer overlap each other, whereby an elliptically polarizing plate in which the direction of the maximum refractive index within a plane of the birefringent optical film is orthogonal to the absorption axis of the polarizing plate is obtained. Accordingly, a so-called "roll-to-roll" production becomes possible, thereby improving the efficiency in production.

Though the stretch ratio of the laminate varies depending on the stretching method, it is in general from 0% to 100% with respect to the length of the unstretched laminate. Preferably, the stretch ratio of the laminate is 0% to 70% with respect to the length of the unstretched laminate.

The temperature for stretching the laminate is selected suitably depending on the glass transition point (Tg) of the laminate in use, the kinds of additives in the laminate, and the like. The temperature for stretching the laminate is, for example, 40° C. to 250° C., preferably 80° C. to 200° C., and particularly preferably 100° C. to 200° C. It is particularly preferable that the temperature for stretching the laminate is substantially equal to or higher than Tg of the laminate to be stretched.

The method of shrinking the laminate is not particularly limited, and ordinary methods can be applied. The examples include a method in which a precursor layer of the birefringent A-layer is formed on a base, and the resultant laminate is heated or cooled so that the base is shrunk, thereby shrinking the laminate as a whole. As the base, a shrinkable base such as a heat shrinkable film or the like can be used. When using a shrinkable base, it is preferable to control the shrinkage of the base using a stretching machine. Specifically, this can be carried out, for example, by setting a tenter stretching machine so that the stretch ratio of the film would be less than 1 or by setting a longitudinal uniaxial stretching machine so that the stretch ratio of the film would be 1 to cause shrinkage in the width direction.

The heat-shrinkable film can be a film formed of, for example, polyester, polystyrene, polyethylene, polypropylene, polyvinyl chloride, or polyvinylidene chloride.

Furthermore, in the method for producing the birefringent optical film of the present invention, when preparing the birefringent A-/B-layer, the birefringent A-/B-layer may be formed by providing a precursor layer of the birefringent A-/B-layer and then stretching or shrinking the precursor layer in the manner described above. In particular, it is preferable that the birefringent A-/B-layer is formed by stretching a precursor layer of the birefringent A-/B-layer that is formed of a polymer exhibiting positive birefringence. Furthermore, when the birefiingent optical film includes, for example, three birefiingent A-layers, the birefringent A-layers can be formed in the following manner. First, three precursor layers for forming these three birefringent A-layers are provided and laminated with each other. Adhesive layers are formed between the respective precursor layers. By stretching or shrinking the three precursor layers altogether in the above-described manner, the birefringent A-layers as the laminate with three-layer structure can be formed.

Furthermore, as described above, the birefringent optical film of the present invention preferably meets the requirement represented by the following formula (4). This is because the birefringent optical film of the present invention meeting this requirement is practical when incorporated in a liquid crystal display or the like.

$$-3°\leq \text{alignment axis accuracy} \leq 3° \quad (4)$$

Note here that the alignment axis accuracy is as defined above.

Still further, the birefringent optical film of the present invention preferably meets the requirements represented by the following formulae (5) and (6). This is because, when the birefringent optical film meets the requirements represented by the formulae (5) and (6), the birefringent optical film has reciprocal wavelength dispersion characteristics so that display coloring can further be prevented as described above.

$$|\Delta nd_a| > |\Delta nd_b| \quad (5)$$

$$\alpha_a < \alpha_b \quad (6)$$

Note here that $\Delta nd_a$, $\Delta nd_b$, $\alpha_a$ and $\alpha_b$ are as defined above.

The birefringent optical film according to the present invention may be used alone or, if required, in combination with an additional optical film or the like to form a laminate for various optical uses, e.g., optical compensating members of various liquid crystal display elements. For example, the birefiingent optical film of the present invention may be used in combination with an iodine-based or dyestuff-based polarizing plate (or polarizer) produced industrially, so as to provide a laminated polarizing plate having a function of compensating and adjusting the birefiingence of a liquid crystal display element.

The polarizing plate that may optionally be used in combination with the birefringent optical film according to the present invention is not particularly limited. However, the polarizing plate basically is configured by laminating a protective layer (film) on at least one surface of a polarizer.

The polarizer (polarizing film) is not particularly limited, but can be a film prepared by a conventionally known method of, for example, dyeing by allowing a film of various kinds to adsorb a dichroic material such as iodine or a dichroic dye, followed by crosslinking, stretching, and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on ethylene-vinyl acetate copolymer, and cellulose-based films. Other than the above, polyene aligned films such as dehydrated PVA and dehydrochlorinated polyvinyl chloride can be used, for example. Among them, a PVA-based film prepared by adsorbing iodine or a dichroic dye and aligning the film is used preferably. The thickness of the polarizing film generally is in the range from 1 to 80 μm, though it is not limited to this.

The protective layer (film) is not particularly limited, but can be a conventionally known transparent film. For example, transparent protective films having excellent transparency, mechanical strength, thermal stability, moisture shielding property, and isotropism are preferable. Specific examples of materials for such a transparent protective layer include cellulose-based resins such as triacetylcellulose; transparent resins based on polyester, polycarbonate, polyamide, polyimide, polyethersulfone, polysulfone, polystyrene, polynorbornene, polyolefin, acrylic substances, acetate, and the like; mixtures of a thermoplastic resin whose side chain has a substituted or unsubtituted imido group and a thermoplastic resin whose side chain has a substituted or unsubtituted phenyl group and nitrile group; and liquid crystal polymers. Thermosetting resins or ultraviolet-curing resins based on the acrylic substances, urethane, acrylic urethane, epoxy, silicones, and the like can be used as well. Among them, a TAC film having a surface saponified with alkali or the like is preferable in light of the polarization property and durability.

Moreover, as the protective layer, the polymer film described in JP 2001-343529 A (WO 01/37007) also can be used. The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methyl maleimide and an acrylonitrile-styrene copolymer. Alternatively, the polymer film may be formed by extruding the resin composition.

It is preferable that the protective layer is colorless, for example. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny, and nz are the same as those described above, and d represents a thickness of the protective film.

$$Rz = \{[(nx+ny)/2] - nz\} \cdot d$$

The transparent protective layer further may have an optically compensating function. As such a transparent protective layer having the optically compensating function, it is possible to use, for example, a known layer used for preventing coloring caused by changes in a visible angle based on retardation in a liquid crystal cell or for widening a preferable viewing angle. Specific examples include various stretched films obtained by stretching the above-described transparent resins uniaxially or biaxially, an alignment film of a liquid crystal polymer or the like, and a laminate obtained by providing an alignment layer of a liquid crystal polymer or the like on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-alignment layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited and can be determined suitably according to retardation or a protective strength, for example. The thickness of the transparent protective layer is, for example, not more than 500 µm, preferably in the range from 5 µm to 300 µm, and more preferably in the range from 5 µm to 150 µm.

The transparent protective layer can be formed suitably by a conventionally known method such as a method of coating a polarizing film with the above-mentioned various transparent resins or a method of laminating the transparent resin film, the optically compensating retardation plate, or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a hardened coating film that is formed of a curable resin and has excellent hardness and smoothness on a surface of the transparent protective layer. The curable resin can be, for example, ultraviolet-curing resins of silicone base, urethane base, acrylic, and epoxy base. The treatment can be carried out by a conventionally known method. The anti-sticking treatment aims to prevent adjacent layers from sticking to each other. The antireflection treatment aims to prevent reflection of external light on the surface of the polarizing plate, and can be carried out by forming a conventionally known antireflection layer or the like.

The anti-glare treatment aims to prevent reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide, or the like. Other than the above, inorganic fine particles having an electrical conductivity, organic fine particles including, for example, crosslinked or uncrosslinked polymer particles, or the like can be used as well. The average particle diameter of the transparent fine particles ranges, for example, from 0.5 to 20 m, though there is no particular limitation. A blend ratio of the transparent fine particles ranges, for example, from 2 to 70 parts by weight, preferably from 5 to 50 parts by weight with respect to 100 parts by weight of the above-described transparent resin, though there is no particular limitation.

An anti-glare layer in which the transparent fine particles are blended can be used as the transparent protective layer itself or provided as a coating layer or the like applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer, the anti-glare layer, and the like as mentioned above can be laminated on the polarizing plate, as a sheet of optical layers including these layers, separately from the transparent protective layer.

The method of laminating the respective components (the birefringent optical film, the polarizer, the transparent protective film, etc.) is not particularly limited but a conventionally known method can be applied. In general, pressure-sensitive adhesives, adhesives, and the like as described above can be used, and the kinds thereof can be determined suitably depending on the materials or the like of the components. Examples of the adhesives include polymer adhesives based on acrylic substances, vinyl alcohol, silicone, polyester, polyurethane, polyester, or the like and rubber-based adhesives. The above-mentioned pressure-sensitive adhesives and adhesives do not peel off easily even when being exposed to moisture or heat, for example, and have excellent light transmittance and polarization degree. More specifically, PVA adhesives are preferable when the polarizer is formed of a PVA-based film, in light of stability of adhering treatment. These adhesive and pressure-sensitive adhesive may be applied directly to surfaces of the polarizing layer and the transparent protective layer, or a layer of a tape or a sheet formed of the adhesive or pressure-sensitive adhesive may be arranged on the surfaces thereof. Further, when these adhesive and pressure-sensitive adhesive are prepared as an aqueous solution, for example, other additives or a catalyst such as an acid catalyst may be blended as necessary.

In the case of applying the adhesive, other additives or a catalyst such as an acid catalyst further may be blended in the aqueous solution of the adhesive. Though the thickness of the adhesive layer is not particularly limited, for example, it is from 1 nm to 500 nm, preferably from 10 nm to 300 nm, and more preferably from 20 nm to 100 nm. It is possible to adopt a known method of using an adhesive etc. such as an acrylic polymer or a vinyl alcohol-based polymer without any particular limitations.

The birefringent optical film of the present invention may be used in combination with various retardation plates, diffusion-control films, brightness-enhancement films, and the like. Examples of the retardation plates include those obtained by uniaxially or biaxially stretching a polymer, those subjected to a treatment for causing Z-axis alignment, and those obtained by applying a liquid crystal polymer. Examples of the diffusion-control films include films that control viewing angles by utilizing diffusion, scattering, and refraction and films that control glaring, scattered light, and the like that affect the resolution by utilizing diffusion, scattering, and refraction. Examples of the brightness-enhancement films include brightness-enhancement films utilizing the selective reflection property of a cholesteric liquid crystal and provided with a $\lambda/4$ plate and scattering films utilizing an anisotropic scatter depending on the polarization direction. Also, the optical film may be used in combination with a wire grid polarizer.

The laminated polarizing plate of the present invention can be used suitably for forming various liquid crystal displays, for example. When using the laminated polarizing plate in a liquid crystal display or the like, one or more other optical layers such as a reflection plate, a semitransparent reflection plate, and a brightness-enhancement film can be laminated additionally as required via an adhesive layer or a pressure-sensitive adhesive layer.

An example of a reflective polarizing plate or a semitransparent reflective polarizing plate will be described. The reflective polarizing plate is prepared by laminating further a reflection plate on a laminated polarizing plate according to the present invention, and the semitransparent reflective polarizing plate is prepared by laminating a semitransparent reflection plate on a laminated polarizing plate according to the present invention.

In general, the reflective polarizing plate is arranged on a backside of a liquid crystal cell in order to make a liquid crystal display (reflective liquid crystal display) that reflects incident light from a visible side (display side). The reflective polarizing plate is advantageous in that, for example, it allows the liquid crystal display to be thinned further because the necessity of providing a light source such as a backlight can be eliminated.

The reflective polarizing plate can be formed in any known manner such as forming a reflection plate of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil formed of a reflective metal such as aluminum.

Another example is a reflective polarizing plate prepared by forming, on a transparent protective layer having a surface with microscopic asperities due to microparticles contained in various transparent resins, a reflection plate corresponding to the microscopic asperities. The reflection plate having a surface with microscopic asperities diffuses incident light irregularly so that directivity and glare can be prevented and irregularity in color tones can be controlled. The reflection plate can be formed by attaching the metal foil or the metal deposited film directly on the surface with asperities of the transparent protective layer by any conventionally known methods including deposition and plating, such as vacuum deposition, ion plating, and sputtering.

As mentioned above, the reflection plate can be formed directly on a transparent protective layer of a polarizing plate. Alternatively, a reflecting sheet or the like formed by providing a reflecting layer on a proper film such as the transparent protective film can be used as the reflection plate. Since a typical reflecting layer of a reflection plate is made of a metal, it is preferably used in a state that the reflecting surface of the reflecting layer is coated with the film, a polarizing plate, or the like, in order to prevent a reduction of the reflectance due to oxidation, and furthermore, to allow the initial reflectance to be maintained for a long period and to avoid the necessity of forming a transparent protective layer separately.

On the other hand, the semitransparent polarizing plate is provided by replacing the reflection plate in the above-mentioned reflective polarizing plate by a semitransparent reflection plate. Examples of a semitransparent polarizing plate include a half mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following description is about an example of a birefringent optical film, a laminated polarizing plate, or the like prepared by further laminating a brightness-enhancement film on the birefringent optical film, the laminated polarizing plate, or the like according to the present invention.

A suitable example of the brightness-enhancement film is not particularly limited, but it can be selected from a multi-layer thin film of a dielectric or a laminate of multiple thin films with varied refraction aeolotropy that transmits linearly polarized light having a predetermined polarization axis while reflecting other light. Examples of such a brightness-enhancement film include "D-BEF (trade name)" manufactured by 3M Co. Also, a cholesteric liquid crystal layer, more specifically, an alignment film of a cholesteric liquid crystal polymer or an alignment liquid crystal layer fixed onto a supportive film base can be used as a brightness-enhancement film. Such a brightness-enhancement film reflects either clockwise or counterclockwise circularly polarized light while it transmits other light. Examples of such a brightness-enhancement film include "PCF 350 (trade name)" manufactured by Nitto Denko Corporation, "Transmax (trade name)" manufactured by Merck and Co., Inc., and the like.

An optical member including a laminate of at least two the above-mentioned optical layers can be formed, for example, by a method of laminating layers separately in a certain order in the process for manufacturing a liquid crystal display or the like. However, efficiency in manufacturing a liquid crystal display or the like can be improved by using an optical member that has been laminated previously because of its excellent stability in quality, assembling operability, and the like. Any appropriate adhesion means such as a pressure-sensitive adhesive layer can be used for lamination as in the above.

Moreover, it is preferable that the birefringent optical film, the laminated polarizing plate, or the like according to the present invention further has a pressure-sensitive adhesive layer or an adhesive layer so as to allow easier lamination onto the other members such as a liquid crystal cell. They can be arranged on one surface or both surfaces of the birefringent optical film, the laminated polarizing plate, or the like. The material for the pressure-sensitive adhesive layer is not particularly limited but can be a conventionally known material such as acrylic polymers. In particular, the pressure-sensitive adhesive layer having a low moisture absorption coefficient and an excellent thermal resistance is preferable from the aspects of prevention of foaming or peeling caused by moisture absorption, prevention of degradation in the optical characteristics and warping of a liquid crystal cell caused by difference in thermal expansion coefficients, a capability of forming a liquid crystal display with high quality and excellent durability, and the like. It also may be possible to incorporate fine particles so as to form the pressure-sensitive adhesive layer showing light diffusion property. For the purpose of forming the pressure-sensitive adhesive layer on the surface of the optical film, the laminated polarizing plate, or the like, a solution or melt of a sticking material can be applied directly on a predetermined surface of the optical film, the laminated polarizing plate, or the like by a development method such as flow-expansion and coating. Alternatively, a pressure-sensitive adhesive layer can be formed on a separator, which will be described below, in the same manner and transferred to a predetermined surface of the birefringent optical film, the laminated polarizing plate, or the like.

In the case where a surface of a pressure-sensitive adhesive layer or an adhesive layer provided on the birefringent optical film, the laminated polarizing plate, or the like is exposed, it is preferable to cover the surface with a separator tentatively so as to prevent contamination until the pressure-sensitive adhesive layer or the adhesive layer is put to use. The separator can be made of a suitable film, e.g., the above-mentioned transparent protective film, coated with a peeling agent if required. The peeling agent may be selected, for example, from a silicone-based agent, a long-chain alkyl-based agent, a fluorine-based agent, an agent containing molybdenum sulfide, and the like.

The respective layers such as the polarizer, the transparent protective layer, the pressure-sensitive adhesive layer, or the adhesive layer for composing the birefringent optical film or the laminated polarizing plate according to the present invention may be subjected to a suitable treatment such as a treatment with an UV absorber, e.g., salicylate ester compounds, benzophenone compounds, benzotriazole compounds, cyanoacrylate compounds, or nickel complex salt-based compounds, thus providing an UV absorbing capability.

The birefringent optical film and the laminated polarizing plate according to the present invention can be used preferably for forming various devices such as liquid crystal displays. For example, a polarizing plate can be arranged on at least one surface of a liquid crystal cell so as to be applied to, for example, a reflection-type, semi-transmission-type, or transmission and reflection type liquid crystal display. A liquid crystal cell to compose the liquid crystal display can be selected arbitrarily. For example, it is possible to use liquid crystal cells of appropriate types such as active matrix driving type represented by a thin film transistor type, a simple matrix driving type represented by a twist nematic type and a super twist nematic type.

Examples of the liquid crystal cell include STN (Super Twisted Nematic) cells, TN (Twisted Nematic) cells, IPS (In-Plane Switching) cells, VA (Vertical Aligned) cells, OCB (Optically Aligned Birefringence) cells, HAN (Hybrid Aligned Nematic) cells, ASM (Axially Symmetric Aligned Microcell) cells, ferroelectric cells, and antiferroelectric cells. The cells may be subjected to an alignment-division systematically or randomly. The birefringent optical film according to the present invention is excellent particularly in optical compensation of VA (Vertical Aligned) cells.

Since the optical film according to the present invention are excellent particularly in optical compensation of a VA (Vertical Aligned) cell, they are most suitably used for viewing-angle compensating films for VA mode liquid crystal displays.

In general, a typical liquid crystal cell is composed of opposing liquid crystal cell substrates and a liquid crystal injected into a space between the substrates. The liquid crystal cell substrates can be made of glass, plastics, or the like without any particular limitations. Materials for the plastic substrates can be selected from conventionally known materials without any particular limitations.

When polarizing plates or optical members are arranged on both sides of a liquid crystal cell, the polarizing plates or the optical members on the surfaces can be the same or different type. Moreover, for forming a liquid crystal display, one or more layers of appropriate members such as a prism array sheet, a lens array sheet, an optical diffuser, and a backlight can be arranged at proper positions.

The birefringent optical film and the laminated polarizing plate according to the present invention can be used not only in the above-described liquid crystal displays but also in, for example, self-light-emitting displays such as organic electroluminescence (EL) displays, plasma displays (PD) and field emission displays (FED). When the optical film or the laminated polarizing plate of the present invention is used in a self-light-emitting flat display, the optical film or the laminated polarizing plate can be used as an antireflection filter because circularly polarized light can be obtained by setting the in-plane retardation value Δnd of the birefringent optical film to λ/4, for example.

The following is a specific description of an electroluminescence (EL) display including a laminated polarizing plate according to the present invention. The EL display of the present invention is a display having a birefringent optical film or a laminated polarizing plate according to the present invention, and can be either an organic EL display or an inorganic EL display.

In recent EL displays, for preventing reflection from an electrode in a black state, use of an optical film such as a polarizer and a polarizing plate as well as a λ/4 plate is proposed. The laminated polarizing plate and the birefringent optical film according to the present invention are especially useful when linearly-polarized light, circularly polarized light, or elliptically polarized light is emitted from an EL layer. The polarizing plate with optical compensation function according to the present invention is especially useful even when an oblique light beam is partially polarized even in the case where natural light is emitted in a front direction.

A typical organic EL display will be explained below. In general, such an organic EL display has a luminant (organic EL luminant) that is prepared by laminating a transparent electrode, an organic luminant layer, and a metal electrode in this order on a transparent substrate. Here, the organic ruminant layer is a laminate of various organic thin films. Examples thereof include various combinations such as a laminate of a hole injection layer made of a triphenylamine derivative or the like and a luminant layer made of a phosphorous organic solid such as anthracene; a laminate of the luminant layer and an electron injection layer made of a perylene derivative or the like; and a laminate of the hole injection layer, the luminant layer, and the electron injection layer.

In general, the organic EL display emits light on the following principle: a voltage is applied to the anode and the cathode so as to inject holes and electrons into the organic luminant layer, energy generated by the re-bonding of these holes and electrons excites the phosphor, and the excited phosphor emits light when it returns to the basis state. The mechanism of the re-bonding of these holes and electrons during the process is similar to that of an ordinary diode. This implies that current and the light emitting intensity exhibit a considerable nonlinearity accompanied with a rectification with respect to the applied voltage.

It is preferred for the organic EL display that at least one of the electrodes is transparent so as to obtain luminescence at the organic luminant layer. In general, a transparent electrode of a transparent conductive material such as indium tin oxide (ITO) is used for the anode. Use of substances having small work function for the cathode is important for facilitating the electron injection and thereby raising luminous efficiency, and in general, metal electrodes such as Mg—Ag and Al—Li can be used.

In an organic EL display configured as described above, it is preferable that the organic ruminant layer is made of a film that is extremely thin such as about 10 nm, so that the organic ruminant layer can transmit substantially whole light as the transparent electrode does. As a result, when the layer does not illuminate, a light beam entering from the surface of the transparent substrate passes through the transparent electrode and the organic luminant layer and is reflected at the metal electrode so that it comes out again to the surface of the transparent substrate. Thereby, the display surface of the organic EL display looks like a mirror when viewed from exterior.

In the organic EL display induding an organic EL luminant having a transparent electrode on the surface side of an organic luminant layer and a metal electrode on the back surface of the organic ruminant layer, for example, it is preferable that a birefringent optical film or a laminated polarizing plate according to the present invention is arranged on the surface of the transparent electrode, and furthermore, a λ/4 plate is arranged between the polarizing plate and an EL element. As described above, an organic EL display obtained by arranging a birefringent optical film according to the present invention can suppress external reflection and improve the visibility. It is further preferable that a retardation plate is arranged between the transparent electrode and the birefringent optical film.

The retardation plate and the birefringent optical film (the polarizing plate or the like) polarize, for example, light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode, and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

Hereinafter, the present invention will be described more specifically by way of examples and comparative examples. However, the present invention is by no means limited to the following examples. The characteristics of optical films were evaluated in the following manner.

The retardation and alignment axis accuracy were measured using a retardation meter (manufactured by Oji Scientific Instruments, trade name: KOBRA 21ADH).

The film thickness was measured using a magnetic spectrophotometer (manufactured by Otsuka Electronics Co., Ltd., trade name: MCPD-2000) at wavelengths of 700 to 900 nm according to optical interferometry.

Δnd, Rth and α of birefringent A-layers, birefringent B-layers and birefringent optical films obtained in the following examples and comparative examples were determined by the following equations.

$$\Delta nd = (nx-ny) \cdot d,$$

$$Rth = (nx-nz) \cdot d,$$

$$\alpha = \Delta nd_{430\ nm}/\Delta nd_{550\ nm}$$

In the above equations, nx, ny, and nz respectively represent refractive indices in an X-axis direction, a Y-axis direction, and a Z-axis direction in each of the layers (films), with the X-axis direction being an axial direction exhibiting a maximum refractive index within a plane of each of the layers (films), the Y-axis direction being an axial direction perpendicular to the X axis within the plane, and the Z-axis direction being a thickness direction perpendicular to the X axis and the Y axis.

In the above equations, $\Delta nd_{430\ nm}$ and $\Delta nd_{550\ nm}$ respectively represent Δnd at a wavelength of 430 nm and Δnd at a wavelength of 550 nm.

Example 1

Polyimide represented by a formula (24) below and having a weight-average molecular weight (Mw) of 100,000 was first synthesized from 2,2'-bis(3,4-dicarboxyphenyl)hexafluoropropane and 2,2'-bis(trifluoromethyl)-4,4'-diaminobiphenyl and then dissolved in methyl isobutyl ketone to prepare a 20 wt % solution of this polyimide.

[Chemical Formula 13]

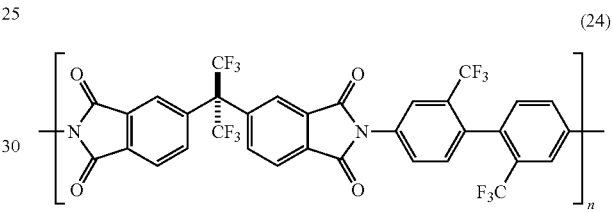

(24)

This polyimide solution was applied onto one surface of "Acryplen (trade name)" (120 μm in thickness) manufactured by Mitsubishi Rayon Co., Ltd. by casting so as to form a 6.2 μm thick layer of the polyimide solution on the Acryplen, thus obtaining a laminate. After the application of the polyimide solution, the laminate was dried at 90° C. for 10 minutes. This laminate was then stretched 8% at 100° C. by longitudinal uniaxial stretching, thus obtaining a birefringent optical film as a laminate including a birefringent A-layer formed of the Acryplen and a birefringent B-layer formed of a polyimide coating layer. Table 1 shows the thickness $d_a$, $\Delta nd_a$, $Rth_a$, $\alpha_a$ and optical characteristics of the thus-obtained birefringent A-layer, the thickness $d_b$, $\Delta nd_b$, $Rth_b$, Δnxz, $\alpha_b$ and optical characteristics of the thus-obtained birefringent B-layer, and the thickness d, Δnd and Rth of the thus-obtained birefringent optical film. Note here that Δnxz is represented by Δnxz=nx–nz, where nx and nz are as defined above.

Example 2

An acrylonitrile-styrene copolymer resin was dissolved in dichloromethane to prepare a 30 wt % solution of this copolymer resin. This solution was applied onto a polyethylene terephthalate film (PET (base)) by casting and allowed to stand at 100° C. for 30 minutes. The copolymer resin layer was then peeled off from the PET film. Thus, a 150 μm thick film was obtained. The thus-obtained film was then stretched 30% at 120° C. by free-end longitudinal stretching, thus obtaining a 132 μm thick birefringent A-layer.

On the other hand, polyimide represented by the above formula (24) and having a weight-average molecular weight (Mw) of 100,000 was first synthesized from 2,2'-bis(3,4-dicarboxyphenyl)hexafluoropropane and 2,2'-bis(trifluoromethyl)-4,4'-dianiinobiphenyl and then dissolved in methyl isobutyl ketone to prepare a 20 wt % solution of this polyimide.

This polyimide solution was applied onto one surface of a TAC film (80 μm in thickness) by casting so as to form a 10.8 μm thick layer of the polyimide solution on the TAC film, thus obtaining a laminate. After the application of the polyimide solution, the laminate was dried at 100° C. for 10 minutes. This laminate was then stretched 3% at 150° C. by fixed-end transverse uniaxial stretching. Thereafter, the polyimide layer was peeled off from the TAC film. Thus, a birefringent B-layer was obtained.

The birefringent A-layer and the birefringent B-layer were bonded to each other via an acrylic pressure sensitive adhesive layer (20 μm in thickness) so that the directions exhibiting the maximum refractive indices in the respective layers were orthogonal to each other, thus obtaining a birefringent optical film. Table 1 shows the thickness $d_a$, $\Delta nd_a$, $Rth_a$, $\alpha_a$ and optical characteristics of the thus-obtained birefringent A-layer, the thickness $d_b$, $\Delta nd_b$, $Rth_b$, $\Delta nxz$, $\alpha_b$ and optical characteristics of the thus-obtained birefringent B-layer, and the thickness d, $\Delta nd$ and Rth of the thus-obtained birefringent optical film.

Example 3

A biaxially stretched polypropylene film (60 μm in thickness) was bonded to each surface of a polycarbonate film via an acrylic pressure sensitive adhesive layer (20 μm in thickness). The thus-obtained laminate was stretched 7% at 150° C. by free-end longitudinal uniaxial stretching, thus obtaining a 40 μm thick birefringent A-layer.

On the other hand, polyimide represented by the above formula (24) and having a weight-average molecular weight (Mw) of 100,000 was first synthesized from 2,2'-bis(3,4-dicarboxyphenyl)hexafluoropropane and 2,2'-bis(trifluoromethyl)-4,4'-diaminobiphenyl and then dissolved in methyl isobutyl ketone to prepare a 20 wt % solution of this polyimide.

This polyimide solution was applied onto one surface of a TAC film (80 μm in thickness) by casting so as to form a 9.5 μm thick layer of the polyimide solution on the TAC film, thus obtaining a laminate. After the application of the polyimide solution, the laminate was dried at 100° C. for 10 minutes. This laminate was then stretched 7% at 150° C. by fixed-end transverse stretching. Thereafter, the polyimide layer was peeled off from the TAC film. Thus, a birefringent B-layer was obtained.

The birefringent A-layer and the birefringent B-layer were bonded to each other via an acrylic pressure sensitive adhesive layer (20 μm in thickness) so that the directions exhibiting the maximum refractive indices in the respective layers were orthogonal to each other, thus obtaining a birefringent optical film. Table 1 shows the thickness $d_a$, $\Delta nd_a$, $Rth_a$, $\alpha_a$ and optical characteristics of the thus-obtained birefringent A-layer, the thickness $d_b$, $\Delta nd_b$, $Rth_b$, $\Delta nxz$, $\alpha_b$ and optical characteristics of the thus-obtained birefringent B-layer, and the thickness d, $\Delta nd$ and Rth of the thus-obtained birefringent optical film.

Comparative Example 1

Polyimide represented by the above formula (24) and having a weight-average molecular weight (Mw) of 100,000 was first synthesized from 2,2'-bis(3,4-dicarboxyphenyl)hexafluoropropane and 2,2'-bis(trifluoromethyl)-4,4'-diaminobiphenyl and then dissolved in methyl isobutyl ketone to prepare a 15 wt % solution of this polyimide.

This polyimide solution was applied onto one surface of "ZEONOR (trade name)" (100 μm in thickness) manufactured by ZEON Corporation by casting so as to form a 6 μm thick layer of the polyimide solution on the ZEONOR, thus obtaining a laminate. After the application of the polyimide solution, the laminate was dried at 130° C. for 5 minutes. The laminate was then stretched 7% at 130° C. by fixed-end transverse stretching, thus obtaining a birefringent optical film as a laminate including a birefringent A-layer formed of the ZEONOR and a birefringent B-layer formed of a polyimide coating layer. Table 1 shows the thickness $d_a$, $\Delta nd_a$, $Rth_a$, $\alpha_a$ and optical characteristics of the thus-obtained birefringent A-layer, the thickness $d_b$, $\Delta nd_b$, $Rth_b$, $\Delta nxz$, $\alpha_b$ and optical characteristics of the thus-obtained birefringent B-layer, and the thickness d, $\Delta nd$ and Rth of the thus-obtained birefringent optical film.

Comparative Example 2

A film "ARTON (trade name)" (100 μm in thickness) manufactured by JSR Corporation was stretched 20% at 175° C. by fixed-end transverse stretching, thus obtaining a birefringent optical film composed only of a birefringent A-layer. Table 1 shows the thickness $d_a$, $\Delta nd_a$, $Rth_a$, $\alpha_a$ and optical characteristics of the thus-obtained birefringent A-layer.

Comparative Example 3

A film "Acryplen (trade name)" (120 μm in thickness) manufactured by Mitsubishi Rayon Co., Ltd. was stretched 60% at 100° C. by free-end longitudinal stretching, thus obtaining a birefringent optical film composed only of a birefringent A-layer. Table 1 shows the thickness $d_a$, $\Delta nd_a$, $Rth_a$, $\alpha_a$ and optical characteristics of the thus-obtained birefringent A-layer.

Comparative Example 4

Polyimide represented by the above formula (24) and having a weight-average molecular weight (Mw) of 100,000 was first synthesized from 2,2'-bis(3,4-dicarboxyphenyl)hexafluoropropane and 2,2'-bis(trifluoromethyl)-4,4'-diaminobiphenyl and then dissolved in methyl isobutyl ketone to prepare a 15 wt % solution of this polyimide.

This polyimide solution was applied onto one surface of a TAC film (as a base) by casting so as to form a 6.5 μm thick layer of the polyimide solution on the TAC film, followed by drying at 100° C. for 10 minutes. Then, the base and the polyamide coating layer altogether were stretched 10% at 150° C. by fixed-end transverse stretching. Thereafter, the polyamide coating layer was peeled off from the TAC film (the base), thereby obtaining a birefringent optical film composed only of a birefringent B-layer. Table 1 shows the thickness $d_b$, $\Delta nd_b$, $Rth_b$, $\Delta nxz$, $\alpha_b$ and optical characteristics of the thus-obtained birefringent B-layer.

TABLE 1

| | A-layer | | | | | B-layer | | | | | | Birefringent optical film | | |
|---|---|---|---|---|---|---|---|---|---|---|---|---|---|---|
| | $d_a$ (μm) | $\Delta nd_a$ (nm) | $Rth_a$ (nm) | $\alpha_a$ | | $d_b$ (μm) | $\Delta nd_b$ (nm) | $Rth_b$ (nm) | $\Delta nxz$ | $\alpha_b$ | | d (μm) | $\Delta nd$ (nm) | Rth (nm) |
| Ex. 1 | 119 | −15 | −14 | 1.05 | ny > nz > nx | 6 | 80 | 245 | 0.041 | 1.12 | nx > ny > nz | 125 | 65 | 231 |
| Ex. 2 | 132 | −102 | −100 | 1.06 | ny > nz > nx | 10.5 | 25 | 390 | 0.037 | 1.12 | nx > ny > nz | 162.5 | −77 | 290 |
| Ex. 3 | 40 | −218 | −109 | 1.09 | ny > nz > nx | 9 | 62 | 360 | 0.040 | 1.12 | nx > ny > nz | 69 | −156 | 251 |
| Comp. Ex. 1 | 95 | 28 | 52 | 1.01 | nx > ny > nz | 5.6 | 37 | 220 | 0.042 | 1.12 | nx > ny > nz | 100.6 | 65 | 272 |
| Comp. Ex. 2 | 83 | 49 | 118 | 1.01 | nx > ny > nz | — | — | — | — | — | — | 83 | 49 | 118 |
| Comp. Ex. 3 | 90 | 53 | 1.2 | 1.05 | ny > nz > nx | — | — | — | — | — | — | 90 | 53 | 1.2 |
| Comp. Ex. 4 | — | — | — | | — | 6 | 60 | 240 | 0.04 | 1.02 | nx > ny > nz | 6 | 60 | 240 |

(Evaluation of Panel Viewing Angle Property)

Each of the birefringent optical films obtained in Examples 1 to 3 and Comparative Examples 1 to 4 was bonded to a polarizing plate (trade name: SEG1425DU, manufactured by Nitto Denko Corporation) via an acrylic pressure sensitive adhesive layer (20 μm in thickness), thus obtaining a laminated polarizing plate. In the laminated polarizing plate, the birefringent optical film was arranged so that the birefringent B-layer included therein faced the polarizing plate. The thus-obtained laminated polarizing plate and a polarizing plate (trade name: SEG1425DU, manufactured by Nitto Denko Corporation) respectively were disposed on both surfaces of a VA type liquid crystal liquid crystal cell so that the slow axes of the respective polarizing plates are orthogonal to each other, thus obtaining a liquid crystal display. The laminated polarizing plate was arranged on the rear side of the liquid crystal cell so that the polarizing plate included therein came in contact with the liquid crystal cell.

Next, for the thus-obtained respective liquid crystal displays, viewing angles at contrast ratios of (Co)≧10 in a vertical direction, in a lateral direction, in a diagonal direction (45° to 225°) and in a diagonal direction (135° to 315°) were measured. The contrast ratios were obtained by, displaying a white image and a black image on each of the liquid crystal displays, for measuring the values of Y, x, and y in a XYZ display system at viewing angles of 0-70° at the front, upper, lower, right and left sides of the display, by using an instrument (trade name: Ez contrast 160D, manufactured by ELDIM SA.). Based on the Y-value ($Y_W$) for the white image and the Y-value ($Y_B$) for the black image, the contrast ratio ($Y_W/Y_B$) for every viewing angle was calculated. The viewing angle property was evaluated as "Good" when an omnidirectional contrast was 10 or more, while "Bad" indicates that the omnidirectional contrast was lower than 10. The results are shown in Table 2.

(Evaluation of Panel Coloring Prevention)

The liquid crystal displays obtained in the above-described manner were evaluated visually based on the following criteria.

Excellent: no coloring was observed at all
Good: although some coloring was observed, such coloring was allowable in practical use.
Bad: coloring unallowable in practical use was observed.
The results are shown in Table 2.

TABLE 2

| | Panel viewing angle property | Prevention of panel coloring | Front contrast |
|---|---|---|---|
| Ex. 1 | Good | Good | 840 |
| Ex. 2 | Good | Excellent | 830 |
| Ex. 3 | Good | Excellent | 700 |
| Comp. Ex. 1 | Good | Bad | 320 |
| Comp. Ex. 2 | Bad | Bad | 280 |
| Comp. Ex. 3 | Bad | Bad | 850 |
| Comp. Ex. 4 | Good | Bad | 600 |

As shown in Table 2, each birefringent optical film of the present invention could allow the liquid crystal display incorporating the film to achieve excellent contrast and a wide viewing angle and did not cause coloring.

INDUSTRIAL APPLICABILITY

As specifically described above, a birefringent optical film of the present invention allows a liquid crystal display to achieve excellent contrast and a wide viewing angle and does not cause coloring of the liquid crystal display.

The invention claimed is:

1. A birefringent optical film comprising:
at least one birefringent A-layer; and
at least one birefringent B-layer,
wherein the birefringent optical film is capable of being used for viewing-angle compensating films for VA mode liquid crystal displays,
the birefringent A-layer has a property satisfying $ny_a > nz_a > nx_a$ and
the birefringent B-layer has a property satisfying $nx_b > ny_b > nz_b$,
the birefringent B-layer is formed of a polymer exhibiting positive birefringence, and
an in-plane retardation of the birefringent optical film has reciprocal wavelength dispersion characteristics,
where $nx_a$, $ny_a$ and $nz_a$ respectively represent refractive indices in an X-axis direction, a Y-axis direction, and a Z-axis direction in the birefringent A-layer, with the X-axis direction being an axial direction that is the same as a below-mentioned X-axis direction of the birefringent B-layer, the Y-axis direction being an axial direction that is the same as a below-mentioned Y-axis direction of the birefringent B-layer, and the Z-axis direction being a thickness direction perpendicular to the X axis and the Y axis, and $nx_b$, $ny_b$ and $nz_b$ respectively represent refractive indices in the X-axis direction, the Y-axis direction, and a Z-axis direction in the birefringent B-layer, with the X-axis direction being an axial direction exhibiting a maximum refractive index within a plane of the birefringent B-layer, the Y-axis direction being an axial direction perpendicular to the X axis within the plane, and the Z-axis direction being a thickness direction perpendicular to the X axis and the Y axis.

2. The birefringent optical film according to claim 1, wherein the birefringent B-layer meets a requirement represented by a formula (1) below, $$0.005 \leq \Delta n_b \leq 0.2 \tag{1}$$

where $\Delta n_b$ is $nx_b - nz_b$, and $nx_b$ and $nz_b$ respectively represent the refractive indices in the X-axis direction and the Z-axis direction in the birefringent B-layer, with the X-axis direction being the axial direction exhibiting the maximum refractive index within the plane of the birefringent B-layer and the Z-axis direction being the thickness direction perpendicular to the X-axis.

3. The birefringent optical film according to claim 1, wherein the birefringent A-layer is formed of at least one of a polymer exhibiting negative birefringence and a polymer exhibiting positive birefringence.

4. The birefringent optical film according to claim 3, wherein the birefringent A-layer is formed of a mixture of the polymer exhibiting negative birefringence and the polymer exhibiting positive birefringence.

5. The birefringent optical film according to claim 1, wherein the polymer exhibiting positive birefringence is at least one polymer selected from the group consisting of polyamide, polyimide, polyester, polyetherketone, polyaryletherketone, polyamide imide and polyesterimide.

6. The birefringent optical film according to claim 1, meeting a requirement represented by a formula (4) below, $$-3° \leq \text{alignment axis accuracy} \leq 3° \tag{4}$$

where the alignment axis accuracy refers to variation in slow axis within a plane of the birefringent optical film.

7. The birefringent optical film according to claim 1, meeting requirements represented by formulae (5) and (6) below, $$|\Delta nd_a| > |\Delta nd_b| \tag{5}$$

$$\alpha_a < \alpha_b \tag{6}$$

in the formulae (5) and (6), $\Delta nd_a = (nx_a - ny_a) \cdot d_a$, $\Delta nd_b = (nx_b - ny_b) \cdot d_b$, $\alpha_a = \Delta nd_{a430nm} / \Delta nd_{a550nm}$, and $\alpha_b = \Delta nd_{b430nm} / \Delta nd_{b550nm}$, where $nx_a$ and $ny_a$ respectively represent the refractive indices in the X-axis direction and the Y-axis direction in the birefringent A-layer, with the X-axis direction being the axial direction that is the same as the X-axis direction of the birefringent B-layer and the Y-axis direction being the axial direction that is the same as the Y-axis direction of the birefringent B-layer, and $d_a$ represents a thickness of the birefringent A-layer, $nx_b$ and $ny_b$ respectively represent the refractive indices in the X-axis direction and the Y-axis direction in the birefringent B-layer, with the X-axis direction being the axial direction exhibiting the maximum refractive index within the plane of the birefringent B-layer and the Y-axis direction being the axial direction perpendicular to the X-axis within the plane, and $d_b$ represents a thickness of the birefringent B-layer, $\Delta nd_{a430nm}$ and $\Delta nd_{a550nm}$ respectively represent $\Delta nd_a$ values of the birefringent A-layer at wavelengths of 430 nm and 550 nm, and $\Delta nd_{b430nm}$ and $\Delta nd_{b550nm}$ respectively represent $\Delta nd_b$ values of the birefringent B-layer at the wavelengths of 430 nm and 550 nm.

8. A laminated polarizing plate comprising a birefringent optical film, wherein the birefringent optical film is the birefringent optical film according to claim 1.

9. A liquid crystal panel comprising a liquid crystal cell and an optical member, the optical member being disposed on at least one surface of the liquid crystal cell,
wherein the optical member is the birefringent optical film according to claim 1 or a laminated polarizing plate comprising the birefringent optical film according to claim 1.

10. A liquid crystal display comprising a liquid crystal panel, wherein the liquid crystal panel is the liquid crystal panel according to claim 9.

11. An image display comprising the birefringent optical film according to claim 1 or a laminated polarizing plate comprising the birefringent optical film according to claim 1.

12. The birefringent optical film according to claim 4, wherein the polymer exhibiting negative birefringence and the polymer exhibiting positive bireficingence contained in the mixture for forming the bireficingent A-layer are compatible with each other.

13. The birefringent optical film according to claim 1, comprising one birefringent A-layer and one to three birefringent B-layers.

14. The birefringent optical film according to claim 1, wherein the bireficingent B-layer is formed of at least one polymer selected from the group consisting of polyamide, polyimide, polyetherketone, polyaryletherketone, polyamide imide and polyesterimide, and
the thickness of the birefringent B-layer is 0.1 to 30 μm.

* * * * *

UNITED STATES PATENT AND TRADEMARK OFFICE
CERTIFICATE OF CORRECTION

PATENT NO. : 7,535,531 B2  Page 1 of 1
APPLICATION NO. : 10/540486
DATED : May 19, 2009
INVENTOR(S) : Yuuichi Nishikouji et al.

It is certified that error appears in the above-identified patent and that said Letters Patent is hereby corrected as shown below:

On the title page item (54) and col. 1, line 1,

Change
"(54)  BIREFRINGENT OPTICAL FILM, LAMINATED POLARIZING PLATE, LIQUID CRYSTAL DISPLAY AND IMAGE"

To be

--(54)  BIREFRINGENT OPTICAL FILM, LAMINATED POLARIZING PLATE, LIQUID CRYSTAL DISPLAY AND IMAGE DISPLAY--

Signed and Sealed this

Third Day of November, 2009

David J. Kappos
*Director of the United States Patent and Trademark Office*